INVENTOR.
ARTHUR R. MORTON, JR
BY Donald E. Payne
his attorney 3,261,256
SEDIMENTATION RATE TESTER
Arthur R. Morton, Jr., 1242 Madrid Road,
Santa Fe, N. Mex.
Filed Sept. 14, 1962, Ser. No. 223,781
1 Claim. (Cl. 88—14)

This invention relates to an improved sedimentation rate tester and it pertains more particularly to an improved photographic method and means for making an ESR (erythrocytes sedimentation rate) test on a sample of blood.

The test to determine the ESR has heretofore been a manual technique. Briefly, a blood sample collected within one hour is diluted with the standard amount of anticoagulant (e.g. Vacutainer), gently mixed for two minutes at room temperature, placed in a Winthrope tube which in turn is placed in a tube-holder or rack, and a reading is made by the technician every five minutes to determine how many millimeters below the upper surface is the interface between the upper, clear, yellow layer of plasma and the lower dark red layer of settled red blood cells or erythrocytes. The readings are indicated on a graph or chart which is formed by drawing a line through the points indicated by the five-minute readings. Sedimentation is continued for one hour. Both the extent of sedimentation and the shape of the "rate" curve are of importance in medical diagnosis. The percentage of cells in the blood sample may be determined by centrifuging for fifteen minutes at 2,000 r.p.m. a sample of blood in a Winthrope tube, this determination being referred to as the Hematocrit.

An object of my invention is to provide a method and means for conducting the ESR test photographically so that possible human error will be substantially eliminated, so that readings are recorded automatically and a saving of technician's time is effected, and so that a more complete and detailed curve of the sedimentation rate is obtained which makes diagnosis of maladies more extensive and more trustworthy. In other words, my object is to make the ESR test more precise and meaningful and at the same time less expensive. Other objects will become apparent as the detailed description of the invention proceeds.

Briefly, my invention comprises a new type of photographic equipment. The transparent sample tube containing a fluid suspension of settable material is held in the path of a beam of light, a photosensitive sheet (film, plate, paper, or the like) is positioned to receive light from the sample in the tube, the light thus received is limited at any instant to a vertical line representing light from both the upper and the lower layers of materials in the tube, including the interface between said layers, and the photographic sheet is moved horizontally with respect to light from the sample tube so that a large number of such vertical lines of light are sequentially imposed on the sheet at a uniform rate, either continuously or intermittently. When the sheet is photographically developed, it will disclose a boundary line between upper and lower areas of different shades, said boundary line constituting the sedimentation rate curve. To obtain a sharp image of the interface (or upper red cell level) I prefer to expose the photographic sheet to transmitted light (i.e., light which has passed through the sample tube and sample therein) and to employ a lens for focusing the light from the sample on the sheet as a sharp, thin line. A vertical light slit is preferably positioned adjacent the photographic sheet, this being of particular importance in the absence of adequate lens and shielding structure to prevent impingement on the sheet of light from other source or sources. If reflected light is used and the equipment is of the type used for making time-lapse movies, there must be an opaque sheet or light barrier in front of the photographic sheet or film, and the opaque sheet or light barrier must be provided with a vertical light slit, either the slit or the photographic sheet being moved at a uniform (constant or intermittent) rate so as to provide such a large number of lines on a single sheet or frame as to give a substantially continuous boundary or curve between an upper area of different shade than a lower area.

The invention will be more clearly understood from the following detailed description of a specific embodiment of my invention, constituting my preferred example, and certain alternatives, all as shown in the accompanying drawings which form a part of this disclosure and in which.

Figure 1:
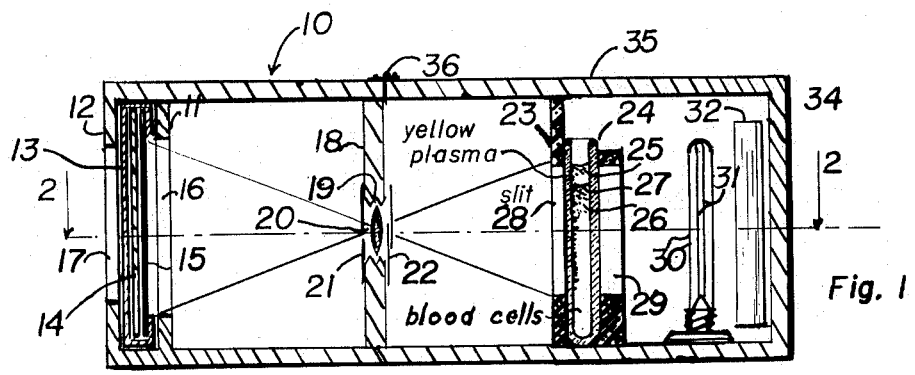
FIG. 1 is a vertical section through my tester taken along line 1—1 of FIG. 2.
Figure 2:
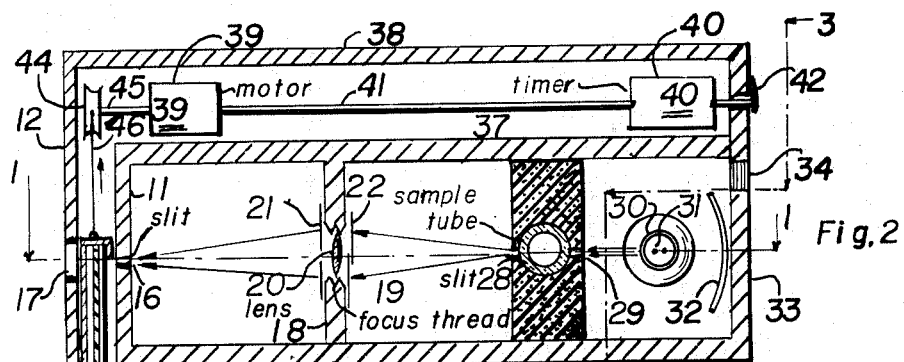
FIG. 2 is a horizontal section thereof taken along line 2—2 of FIG. 1.
Figure 3:
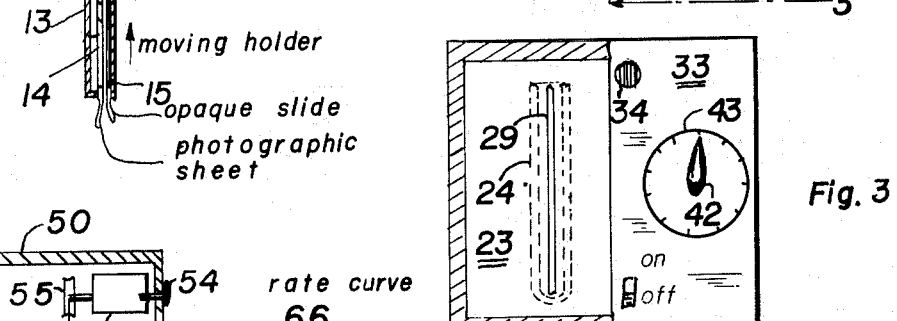
FIG. 3 is partial front view and partial section taken along line 3—3 of FIG. 2.

Referring to FIGS. 1, 2 and 3, my preferred tester has an outer case 10 having inner back wall 11 and outer back wall 12 between which a holder 13 for photosensitive sheet 14 is slideably mounted. An opaque or dark slide 15 is usually positioned in front of sheet 14 till the holder 13 is in the tester, at which time the slide 15 may be pulled out. Inner back wall 11 has a vertical light slit 16 which is adjacent sheet 14 during the test. Outer rear wall 12 may also have a vertical opening 17 therein so that a ground glass focusing plate (not shown) may be observed when it is inserted between the inner and outer backs in place of holder 13.

Spaced from inner back wall 11 is lens wall 18, which extends from wall to wall and from top to bottom, and which has a threaded central opening 19 for receiving a barrel type lens assembly including lens 20, iris diaphragm 21 and shutter 22. When an elongated or cylindrical type lens is used instead of a circular lens, the tester may be designed and operated so that no iris diaphragm or shutter is employed, and they are not always essential for spherical lenses. In this example the lens is focused by turning the lens assembly in the threaded opening till a sharp thin line on the ground glass plate represents the light from the sample tube.

Sample wall 23 also extends from side to side and from top to bottom. At its center it has a vertical well in which sample tube 24 fits snugly. When a blood sample has been allowed to settle for sufficient time there will be an upper, yellow, clear, plasma layer 25 and a lower erythrocyte (red blood cell) layer 26 with an interface 27 therebetween. On the lens-wall side of sample wall 23 there is a narrow (0.1 to 0.01 inch, e.g. 0.05 inch) slit 28 for passage of light from the sample through the lens to the photographic sheet. The slit 29 on the light-source side may be about the same width or somewhat wider than slit 28, but it must be designed to prevent leakage of light around the tube. Sample wall 23 is preferably fabricated from a rubber or plastic foam that serves as an insulator against heat from the light source and also serves to dampen any vibration and keep the tube quiescent.

In front of slit 29 there is a light source, which in this case is an elongated bulb 30 with vertical filaments 31, a low wattage light (e.g. 2 to 10 watts or more) being preferred unless so-called "cold light" of the fluorescent, gas-filled-tube type is feasible. The light source may be constant, periodically effective by virtue of the shutter, or may be of the "electronic flash" type conventionally used in photography, the flashes being timed in the latter case to once every few seconds, i.e. every 2 to 30 or more seconds. At less expense, however, good results can be obtained with a 2-watt bulb and a continuously moving photographic sheet, particularly when using an efficient reflector 32. In the upper corner of front wall 33 and above the reflector I may provide a small light and/or a circular clear or ruby window 34 to serve as a pilot light or indication that the unit is in use.

The front portion of the top 35 of the tester may be opened on hinges 36 for positioning the sample tube and/or replacing the light bulb. The shutter may be closed by a latch-release and Bowden wire mechanism (not shown) or solenoid and switch arrangement when the top is opened to avoid exposure of the photosensitive sheet.

Inner back wall 11 extends to inner side wall 37 and outer back wall 12 extends to outer side wall 38. Between these side walls there is a motor 39 and a timer 40 which may be operatively connected by shaft 41 or which may be a unitary device. The timer is preferably of the switch type so that when knob or pointer 42 is turned to the desired time interval on scale 43, light 30 is turned on and the motor is likewise started. Pulley 44 on motor shaft 45 winds wire or cable 46 to advance holder 13 at a constant rate of speed past slit 16. At the termination of the time period (usually one hour) the timer turns off the light and stops the motor. In this example the timer is mechanically operated by a spring which is wound by setting pointer 42 and shaft 41 supplies the motive power to turn pulley 44 and thus slowly move the photographic film, plate or paper past slit 16. The light is a 4-watt bulb which is turned off and on by the timer 42. It will be understood that the timer, motor, light, and shutter may be electrically operated by a system designed for the usual 110–120 volt A.C. and that instead of passing a beam of light constantly through sample 25–26, the film or other sensitized sheet may be passed at a uniform intermittent rate. The light may be an electronic flash of one-thousandth of a second or less at a time interval of every 2 to 40 seconds, or the timer may actuate the shutter every 2 to 40 seconds, more or less. In any event, when the sensitized sheet is developed there will be a substantially continuous line of demarcation between an upper dark area of the resulting print and a lower area of different shade, and this line is the ESR or settling rate curve.

As for the operation of the system shown in FIGURES 1, 2 and 3, the lens is pre-focused by turning the lens-mount in threads 19 till light from slit 28 reaches the ground glass in a thin sharp line. Prompty after taking a blood sample and placing it in a Winthrope sample tube 24 with the proper amount of anticoagulant (e.g. Vacutainer) and gently agitating it for about two minutes, the sample is placed in the well in wall 23, cover 35 is closed, a photographic plate-holder 13 is introduced between walls 11 and 12 and connected to wire or cable 46, the opaque slide 15 is pulled out to ready plate 14 for exposure, and switch 42 is turned to the 1-hour marker, thus turning on light 30 and starting the movement of the plate past slit 16 at a uniform rate, the iris diaphragm 21 and shutter 22 both remaining open in this example. At the end of the hour the timer-switch 40 turns off the light and stops the motor. The sample may then be removed and centrifuged for 15 minutes at 2,000 r.p.m. in the Winthrope tube to determine the percentage of volume of cells in the blood sample (Hematocrit), after which the tube may be returned to the well in wall 23 and exposed for a long enough time to light from bulb 30 to record the final interface between plasma and cells. The dark slide 15 is then replaced, the plate-holder is disconnected and removed to a dark-room, and the plate is there developed. The developed plate may serve as the record or an enlarged print may be made from it, as will be described in connection with FIG. 4. If a Polaroid Land camera back is employed in place of the plate-holder, a finished print may be obtained in 10 to 60 seconds.

Figures 4, 5, 6:
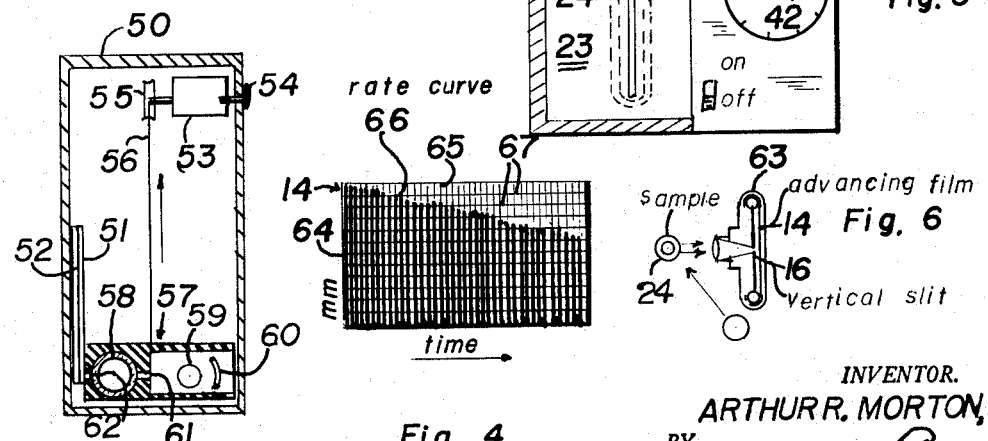
FIG. 4 is an example of a type of rate curve obtained.
FIG. 5 is a diagrammatic horizontal view of a modification in which the lamp-house and sample move past a stationary photographic sheet.
FIG. 6 is a diagrammatic horizontal view of a system for using reflected light instead of transmitted light.

FIG. 5 represents an alternative system in which a dark box or casing 50 may hold a dark slide 51 which may be removed to ready photographic paper 52 for exposure. Timer-motor 53, set by pointer knob 54, turns pulley 55 which winds wire 56 at a uniform rate and pulls lamp house assembly 57 past the stationary paper 52. Sample tube 58 is illuminated by light from source 59 and from reflector 60, the light passing through slit 61, thence through the sample tube 58 and thence through narrow slit 62. At the end of the hour, the light is turned off and the motor is stopped by motor-timer 53 so that the exposed paper, which may again be protected by dark slide 51, may subsequently be developed to give an upper dark area and a lower lighter gray area with the boundary line between the two different shades giving the settling rate curve similar to that shown in FIG. 4.

FIGURE 6 represents a system for using reflected instead of transmitted light in a camera 63 of the type used for making time-lapse movies. The camera must be modified, however, to advance the film 14 in very small increments so that in an hour it will have continuously or intermittently, at a uniform rate, advanced only one frame, or not more than a few inches, and so that each exposure will be only a line instead of a full frame. A vertical narrow slit 16 in an opaque shield limits the light which may reach the film to only a line. The shutter may be synchronized with an electronic flash to take a "line" every few seconds, and when the final exposed film is developed and an enlarged print is made therefrom, it will be of the type shown in FIG. 4.

In FIG. 4, it will be noted that since the light passing through red cells is much less than that passing through the yellow plasma, the red cells show one shade 64 while the plasma shows another shade 65, there being a demarcation 66 between them indicating the level of the red cells. Successive exposures taken continuously or at short time intervals show this demarcation as a line or curve which represents the settling rate. Time is measured on the horizontal side and settling in mm. is measured on the vertical side. Since the Winthrope tube has mm. graduations etched on its side, these etched marks show up on the final print as fine lines 67 which enable the settling curve to be read as of any time interval with great accuracy.

While certain embodiments of my invention have been disclosed in considerable detail, it should be understood that they are by way of example. By using a film or paper that is particularly responsive to yellow (or refractive to red), the plasma may be shown with even greater contrast with respect to the red cells. As for the apparatus, many modifications and alternative arrangements will be apparent from the foregoing description to those skilled in the art.

I claim:

A sedimentation rate determining device which comprises a case, a lamp-house compartment at one end of the case, a photographic-medium holder at the other end of the case, a vertical blood sample tube holder of heat insulation material in the case with a vertical light slit positioned to transmit to the photographic-medium light which has passed through the sample tube, means for successively and at a constant rate moving the photographic-medium with respect to light from the sample tube, means including a lens interposed in a wall between the sample tube and the photographic medium for focusing the light slit sharply as a line on said photographic medium, and means for illuminating the sample tube at time intervals, whereby the photographic-medium when developed will show a substantially continuous line dividing areas of different shades, which line is an accurate delineation of the rate of sedimentation.

References Cited by the Examiner
UNITED STATES PATENTS

| | | | |
|---|---|---|---|
| 1,068,370 | 7/1913 | Simpson et al. | 88—14 |
| 2,084,201 | 6/1937 | Karolus | 88—14 X |
| 2,725,782 | 12/1955 | Worley | 88—14 |

JEWELL H. PEDERSEN, *Primary Examiner.*

W. L. SIKES, *Assistant Examiner.*